Sept. 29, 1931.  R. B. BEISEL  1,825,301
AEROPLANE
Filed Aug. 8, 1928
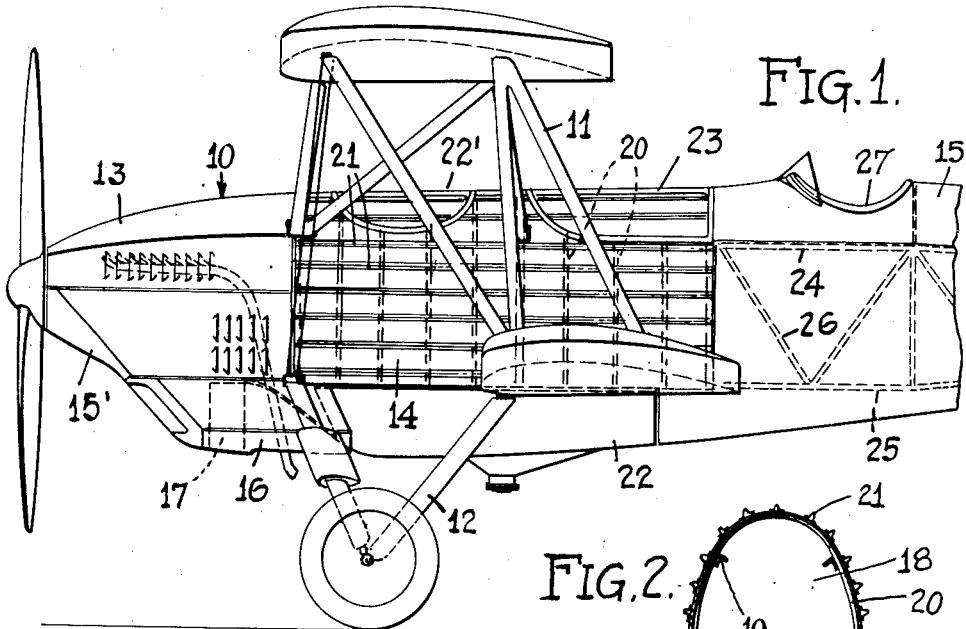
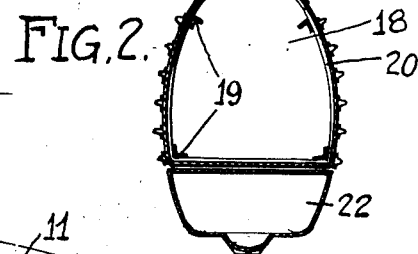
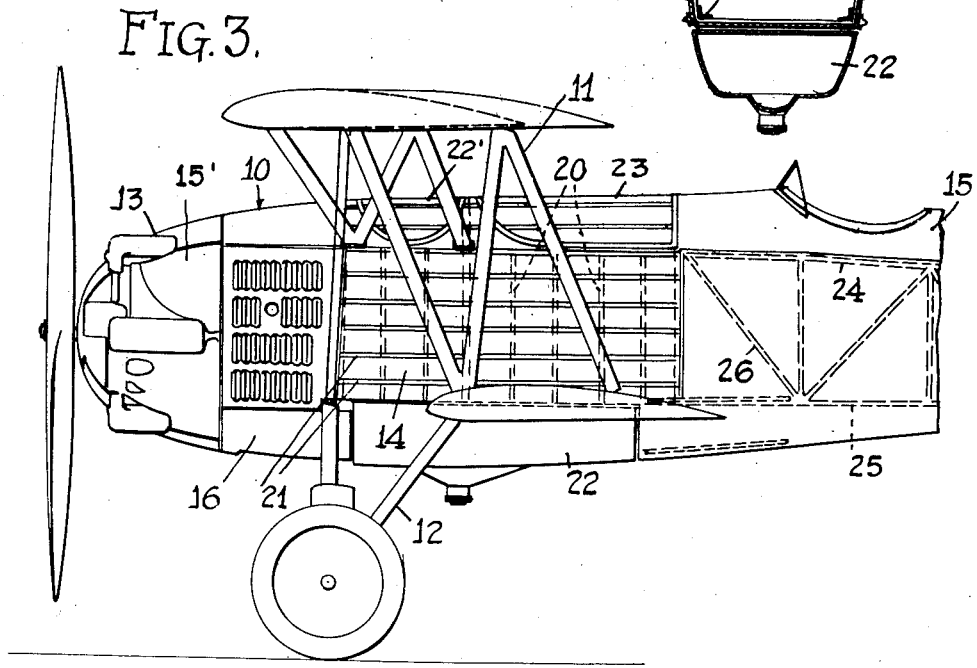
INVENTOR.
REX B. BEISEL.
BY
ATTORNEY.

Patented Sept. 29, 1931

1,825,301

UNITED STATES PATENT OFFICE

REX B. BEISEL, OF HEMPSTEAD, NEW YORK, ASSIGNOR TO CURTISS AEROPLANE & MOTOR COMPANY, INC., A CORPORATION OF NEW YORK

AEROPLANE

Application filed August 8, 1928. Serial No. 298,147.

My invention relates to aeroplanes and more particularly to the fuselage thereof.

Heretofore, aeroplane fuselages have been of one or the other of two distinct types, i. e., either "monocoque" or "trussed". The monocoque body is advantageous in that the interior thereof is generally clean and unobstructed throughout, while the trussed type body is advantageous in that for a given size it is lighter and cheaper to construct and in a crash, is not quite so likely to injure the occupant or occupants of the machine. An object of the present invention is to embody in an aeroplane fuselage certain characteristics of both the above mentioned types. Throughout that portion of its length in which the pay-load is housed and hence, where maximum available storage space is required, the fuselage is constructed in monocoque form. Throughout the remaining portion of its length it is trussed. Within said trussed portion, and preferably aft the storage compartment, cockpit space is provided, and within said trussed portion, ahead of said compartment, the power plant is enclosed. The fuselage, therefore, may be said to comprise three separate fuselage sections, to wit: an intermediate or monocoque section having formed therein a compartment for merchandise or like pay-load, a rear or trussed section having formed therein a cockpit; and a front or third section within which is enclosed the power plant. The sections, altho individually separable, collectively provide a fuselage or body in which the advantages of both the monocoque and trussed type body are to a large extent retained.

A further object of the invention is to provide a transversely divided aeroplane fuselage in which the fuel tank, mounted beneath the intermediate fuselage section, is so shaped and arranged as to merge the streamlines of the forward or engine section cowling into the corresponding lines of the rear or cockpit section.

Other objects and advantages of the invention will be hereinafter disclosed.

In the drawings, wherein like reference characters denote like or corresponding parts, Fig. 1 is a side elevation of a substantial portion of an aeroplane showing the fuselage construction thereof and the relation of the various fuselage sections one to the other;

Fig. 2 is a section on the line 2—2 of Fig. 1, and

Fig. 3 is a view similar to Fig. 1 in which a modified arrangement is illustrated.

In the embodiment of the invention selected for illustration, an aeroplane of more or less conventional appearance is shown. Said aeroplane comprises the usual streamline fuselage or body 10, wing structure 11, and landing gear 12. The fuselage 10, as previously intimated, is transversely divided to provide a forward section 13, an intermediate section 14, and a rear or tail section 15. The forward section 13 is preferably of trussed construction, is detachably fastened to the forward end of the intermediate section 14, and is adapted to receive within the exterior cowling 15' thereof the power plant. On its under side said section 13 has fastened thereto suitable streamlined cowling 16 within which the radiator 17 of the power plant is enclosed.

The intermediate section 14, unlike the forward section 10, is of monocoque construction throughout. Within said section a compartment 18 for merchandise or like pay-load is formed. Preferably the monocoque body section is internally longitudinally reinforced as at 19 and transversely reinforced as at 20, the longitudinal reinforcing members being preferably disposed in forward prolongation of the longérons of the rear or tail section. Said monocoque section is further reinforced, externally, by stringers 21 extending longitudinally thereof in parallel spaced relation. As indicated in Fig. 2, said monocoque section is clean or unobstructed from end to end and is preferably so formed as to provide on the underside thereof space to receive a fuel tank 22. Said tank (see Fig. 1) is so shaped and constructed as to round out the lines of the monocoque section and at the same time merge the streamlines of the cowled-in engine section into the corresponding lines of the rear or tail section 15. If desired, hatches 22' and 23 may be provided that access to the pay-load compartment may be had.

The rear or tail section 15 of the fuselage is of conventional truss construction. It comprises a skeleton frame attached at its forward end to the rear end of the monocoque section 14. Said skeleton frame includes upper longérons 24, lower longérons 25 as well as vertical, horizontal, and diagonal truss members 26. As a fuselage of truss construction is considered to be a safer proposition than a fuselage of monocoque form, said rear fuselage section has formed therein near its forward end a cockpit 27 for the occupant or occupants of the machine. Moreover, said rear fuselage section 15 is suitably cowled or covered in a manner such that its exterior lines merge into the corresponding lines of the intermediate section 14.

In the modification of Fig. 3, the same general construction and arrangement is illustrated. The forward or engine section, however, instead of having mounted therein a power plant of the water-cooled type necessitating a radiator, said section has mounted therein an air-cooled power plant. The cowling for said forward or engine section is therefore differently formed. Preferably said cowling is rounded off rearwardly and on the under side of the fuselage is so shaped as to merge the exterior lines of the engine section into the exterior lines of the gas tank mounted beneath the intermediate or monocoque section of the body.

An aeroplane or aeroplane fuselage characterized as above set forth has certain advantages which are desirable. Throughout that portion of its length given over to the storage of merchandise or like pay-load it is of monocoque construction whereas thru the remaining portion of its length, both fore and aft said monocoque section, it is of trussed construction. It will be seen, therefore, that an aeroplane fuselage thus constructed is a distinct improvement over the more or less conventional unit types. Moreover, by separately constructing each of the three sections of the fuselage, said sections may be separately assembled, removed, and replaced.

While I have described my invention in detail in its present preferred embodiment, it will be obvious to those skilled in the art after understanding my invention, that various changes and modifications may be made therein without departing from the spirit or scope thereof. I aim in the appended claim to cover all such modifications and changes.

What I claim is:

In an aeroplane, a power plant, a transversely divided fuselage including a forward truss section, an intermediate monocoque section and a rear truss section, a power plant attached to and partly enclosed within said forward truss section, a landing gear and a supporting surface, said landing gear and said supporting surface being fastened to said intermediate monocoque section, and said monocoque section being characterized by a total absence of cockpit space for the accommodation of the flying personnel, and a cockpit formed in said rear truss section for the flying personnel, said cockpit being disposed nearer to said intermediate monocoque section than to the rear end thereof.

In testimony whereof I hereunto affix my signature.

REX B. BEISEL.